United States Patent [19]

Yarber, deceased

[11] 3,807,810
[45] Apr. 30, 1974

[54] BRAKE CONTROL VALVE SYSTEM

[76] Inventor: Gordon W. Yarber, deceased, 6070 Ramerez Canyon Rd., late of Malibu, Calif. 90265 Anna Mildred Yarber, administratrix

[22] Filed: July 7, 1971

[21] Appl. No.: 160,342

[52] U.S. Cl. ............... 303/20, 244/111, 303/21 P, 303/40, 303/52
[51] Int. Cl. ............................................. B60t 13/68
[58] Field of Search ........... 91/361; 188/3 R, 181 T; 303/20, 40, 7, 52, 54, 21 P; 244/111

[56] References Cited
UNITED STATES PATENTS

| | | | |
|---|---|---|---|
| 3,402,972 | 9/1968 | Cooper et al. | 303/20 |
| 3,507,542 | 4/1970 | Cannella | 303/7 |
| 3,620,577 | 11/1971 | Neisch et al. | 303/7 X |
| 3,265,447 | 8/1966 | Bueler | 303/54 X |
| 3,449,020 | 6/1969 | Klimek | 303/52 X |
| 3,477,346 | 11/1969 | Slavin et al. | 91/361 |
| 3,671,081 | 6/1972 | Jania et al. | 303/20 X |

FOREIGN PATENTS OR APPLICATIONS

| | | | |
|---|---|---|---|
| 1,914,336 | 10/1970 | Germany | 188/181 T |

*Primary Examiner*—Duane A. Reger
*Assistant Examiner*—Stephen G. Kunin
*Attorney, Agent, or Firm*—Charlton M. Lewis

[57] ABSTRACT

Brake actuating pressure is controlled in accordance with an electrical command signal of analogue type by developing an electrical monitor signal representing the actual output pressure, comparing that signal with the command signal, and controlling a three-way main valve in response to the resulting electrical difference signal to raise or lower the output pressure as required, or to hold the output pressure constant without consumption of pressurized fluid. The difference signal is preferably amplified with sufficient gain to cause the valve to respond stepwise to continuous variations of the command signal. That action may be aided by circuitry for anticipating changes in the monitor signal. The main valve is typically of pressure regulating type, responsive to a control force that is caused to vary in response to the difference signal. The control force is typically developed by a piston having main faces exposed on one side to a reference pressure and on the other side to a control pressure regulated by electrically controlled pilot valves in accordance with the difference signal. Piston movement is preferably accelerated by providing additional piston surfaces, typically larger than the main piston faces, exposed on one side to the output pressure from the main valve and on the other side to the control pressure, thereby accelerating overall valve response to any lack of equilibrium.

4 Claims, 2 Drawing Figures

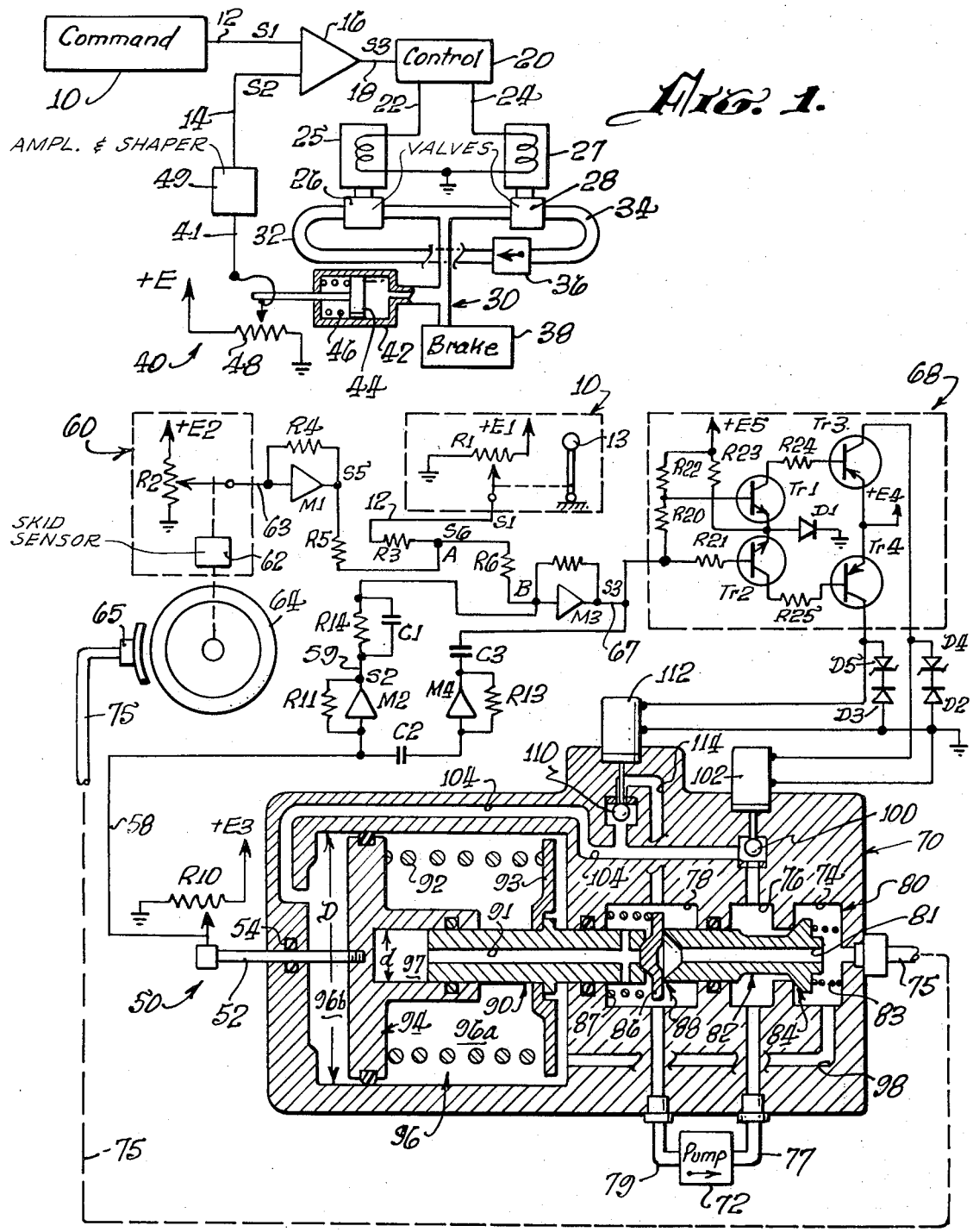

BRAKE CONTROL VALVE SYSTEM

This invention concerns pressure control systems particularly adapted for the actuation of hydraulic or pneumatic brakes in response to a command signal.

A primary object of the invention is to provide valve structure and control mechanism capable of producing an output pressure that is rapidly variable in accurate correspondence to an electrical command signal of analogue form.

A useful type of control system for that general purpose is described and claimed in my U.S. Pat. No. 3,545,817, issued Dec. 8, 1970. In that patent the analogue signal is transformed electrically to digital form, and valve mechanism is provided for controlling the output pressure stepwise in accordance with the digital signals. The present invention employs a different principle of operation.

In accordance with the present invention, the pressure existing at the output of the valve mechanism is effectively monitored by means of a pressure transducer which produces an electrical monitor signal that is an analogue representation of the actual output pressure. That monitor signal is compared electrically to the input analogue command signal, producing a difference signal which is an analogue representation of the algebraic difference between the actual output pressure and the pressure that corresponds to the command signal. Although the difference signal is essentially of analogue form, it is used in such a way as to be effectively a digital signal. Because of that digital action of the difference signal, the overall operation displays the accuracy commonly associated with digital techniques, while retaining the effective smoothness and sensitivity of control commonly associated with analogue techniques.

The valve mechanism of the invention comprises in principle a three-way main valve by which the output line can be connected selectively to a source of supply pressure or to return pressure, typically substantially atmospheric. In neutral position of the main valve, the output line is completely isolated from both supply and return lines. The system includes control structure acting in response to the above described difference signal to connect the output line to supply pressure or to return pressure according as the signal value represents an output pressure less or greater than the pressure represented by the command signal. If the difference signal corresponds to an output pressure equal to the commanded value, or within a small threshold deviation from that value, the main valve remains closed and there is zero flow.

The command signal and the monitor or feedback signal are typically made directly proportional to the commanded pressure and to the actual output pressure, respectively, with equal constants of proportionality. Correct output pressure is then represented by zero value of the difference signal, while too high and too low output pressure are represented by difference signals of opposite polarities.

In the presently preferred form of the invention, the main valve is of pressure regulating type. Such a valve has access directly to the supply and return pressure sources, and acts automatically to raise or lower the output pressure to maintain it proportional to the pressure in a control chamber. That control pressure is varied in response to the described difference signal by means of two pilot valves, typically operated by respective solenoids. One pilot valve opens in response to a difference signal of one polarity to admit pressurized fluid to the control chamber, the other in response to a difference signal of opposite polarity to connect the control chamber to return pressure. The pilot valves then need handle only enough fluid to modify the pressure in the control chamber. The described monitor signal may then be developed, if preferred, by a transducer responsive to the pressure in the control chamber, rather than to the final output pressure downstream of the pressure regulating valve.

In accordance with a further aspect of the invention, the action of the pressure regulating valve is made more sensitive and at the same time more stable by providing a kind of hydraulic negative feedback around that valve. The pressure regulating valve is typically coupled to the pressure in the control chamber via a mechanical coupling force generated by a spring that is compressed by movement of a piston exposed on one side to the control pressure. The other side of the piston has one area exposed to a constant reference pressure and another area exposed to the output pressure from the pressure regulating valve. By making the latter area large compared to the former, say by a factor approximately in the range from two to twenty, any change in the control pressure that is not balanced by the output pressure produces a relatively large force on the piston, resulting in prompt adjustment of the spring force and correction of the output pressure.

When a pressure control system of the described type is used for brake control, failsafe action can be obtained by arranging the valve mechanism so that deletion of electrical power from the system puts the valves in condition to increase the output pressure, resulting in effective break application. That result is obtainable by arranging the pilot valves to be in normal condition (holding the output pressure constant) when the solenoid of the pressure-raising valve is energized and the solenoid of the pressure-lowering valve is deenergized.

The sensitivity of the described pressure control system can be increased virtually indefinitely by amplification of the difference signal, causing the pilot valves to respond to relatively slight departure from system balance.

The pressure transducer which develops the monitor signal may be placed where it will respond essentially immediately to any valve action. When the output pressure differs only moderately from the command pressure, the initial pressure pulse from the resulting valve action may then be sufficient to return the control system to equilibrium, halting fluid flow. The system then typically becomes unbalanced again, either due to fluid equilization or to continuing change of the command signal, producing another pressure pulse. Adjustment of the output pressure then proceeds in a series of pressure pulses, each of which is typically so small that the resulting pressure variation is effectively continuous. The size and period of the increments in the output pressure that result from such pressure pulses can be controlled by selection of circuit constants of the electrical system, and by variation of the rate of pressure adjustment in the fluid portion of the system.

It is ordinarily desirable to make the pressure increments small so that the output pressure will follow the command signal accurately, and to make the time required for each step of adjustment as short as possible.

In the presently preferred system that is accomplished by the hydraulic feedback already referred to, and by including in the electrical system suitable circuitry for effectively steepening the wavefront due to changes in the monitor signal.

When skid control mechanism is to be incorporated in a brake control system of the present type, a skid control valve of conventional type may be placed between the present control system and the brake. However, it is ordinarily preferred to utilize a skid control signal of electrical form and to combine that signal with the initial command signal before comparing the latter with the monitor signal representing the actual output pressure. The present system then provides automatically all pressure modifications required for skid control as well as those comanded by the operator. Alternatively, a desired portion of the skid control action may be obtained in the manner just described, other aspects of skid control being handled independently.

An important advantage of the present system is that no pressurized fluid is expended beyond that used directly for raising the output pressure. The flow of supply fluid can be made strictly zero during periods when the output pressure matches the overall command signal or exceeds the commanded value. That conservation of pressurized fluid permits a maximum utilization of a limited supply of fluid, such as is contained, for example, in a safety reservoir for use in case of malfunction of the regular supply.

A full understanding of the invention, and of its further objects and advantages, will be had from the following description of certain illustrative manners of carrying it out. The particulars of that description, and of the accompanying drawings which form a part of it, are intended only as illustration, and not as a limitation upon the scope of the invention.

In the drawings:

FIG. 1 is a schematic block diagram illustrating certain principles of operation of the invention; and FIG. 2 is a schematic drawing representing illustrative valve structure in axial section and electrical circuitry in accordance with the invention.

In FIG. 1 the numeral 10 designates typical command mechanism for developing on the line 12 an electrical command signal S1, representing the pressure desired in the output conduit 30 for application to the brake 38. Signal S1 is compared in any suitable manner with the monitor signal S2, supplied via the feedback line 14 and representing the actual existing output pressure. As shown in FIG. 1, the signals S1 and S2 are of the same polarity and are compared by the differential amplifier 16. Alternatively, as shown in FIG. 2, if the two signals are of opposite polarity they may be directly summed, and the resulting signal amplified as required. The output from amplifier 16 on the line 18 is a difference signal S3, which may be considered to represent the change in the existing output pressure that is required to produce the desired value.

Difference signal S3 is supplied as control signal to circuitry represented schematically at 20. Control circuitry 20 supplies suitable control currents via the lines 22 and 24 to the respective solenoids 25 and 27 of the two control valves 26 and 28. Those valves control fluid flow between output conduit 30 and respective high and low pressure sources, typically derived from the pump 36. Valves 26 and 28 are normally closed, maintaining steady pressure in output conduit 30. Momentary opening of pressure valve 26 admits fluid under supply pressure from the conduit 32, increasing the output pressure. On the other hand, momentary opening of return valve 28 releases fluid from output circuit 30 to the return conduit 34, reducing the output pressure.

The fluid pressure in output conduit 30 is monitored by a pressure transducer of any suitable type, which produces on the line 41 an electrical monitor signal representing the existing output pressure. Such a transducer is shown schematically at 40 in the form of a cylindrical chamber 42 communicating at one end with conduit 30 and containing a piston 44 and a spring 46. The piston is coupled to the arm of the potentiometer 48, of which the winding is connected between ground and a source of constant voltage +E. Movement of piston 44 against the force of spring 46 develops an electrical signal that is directly proportional to the output pressure. That signal may be amplified or otherwise modified at 49 as required to make it directly comparable to command signal S1, and is supplied via the line 14 as monitor signal S2 to differential amplifier 16, already described. A suitable electrical shaping network is preferably included at 49 to insure stability of the system and to obtain the desired speed of response. If the actual output pressure corresponds accurately to command signal S1, valves 26 and 28 remain closed. Otherwise the valves are operated in a manner to establish the desired pressure.

In practice, direct control of the output pressure by the solenoid valves 26 and 28, as shown schematically in FIG. 1, may not give the sensitivity of control that is required. It is preferred to utilize a main valve of pressure regulating type and to control the action of that valve by means of two pilot valves. The pilot valves then are required to handle only a relatively small volume of fluid, and, indeed, they may be subjected only to pressure differences that are small compared to the full supply pressure in line 32. Also, pressure transducer 40, shown in FIG. 1 as a separate structure, may be integrated with the valve assembly and may respond to the pressure in the control chamber of the pressure regulating valve, instead of responding directly to the final output pressure. In particular, as illustratively shown in FIG. 2, the pressure transducer may be driven mechanically by a piston that is an inherent part of the pressure regulating valve assembly.

The valve structure of FIG. 2 comprises the housing 70, which is shown schematically with omission of its detailed structure for clarity of illustration. The main valve 80 is of pressure regulating type, with the poppet member 82 controlling fluid flow between the axially aligned output chamber 74, pressure chamber 76 and return chamber 78. Output chamber 74 is connected via the conduit 75 to the wheel brake 65, which operates on the wheel 64. Pressure and return chambers 76 and 78 are connected via the respective conduits 77 and 79 to suitable pressure sources, shown as the pressure and suction sides of the pump 72. Poppet member 82 has an axial through bore 81 which opens freely into outlet chamber 74. The end of poppet member 82 in chamber 74 carries peripheral flange structure forming the valve 84 which controls flow from pressure chamber 76 to output chamber 74. The end of the poppet member in return chamber 78 cooperates with the valve plate 86 to form the valve 88, which has approximately the same diameter as valve 84 and which controls flow from outlet chamber 74 via poppet bore 81 to return chamber 78. Plate 86 is urged axially to the right, as seen in FIG. 2, by plunger 90, which is freely slidable axially in the housing with its inner end in return chamber 78 and its outer end in the coaxial piston chamber 96. Plunger 90 is yieldably driven by the coil spring 92, acting through the spring seat 93. The spring force is variably controlled by the piston 94 of diameter D, in response to the fluid pressures acting on the piston. Poppet valve 80 acts in known manner to maintain in output chamber 74 a pressure directly proportional to that spring force. The light springs 83 and 87 insure reliable leak free operation without significantly modifying it.

The outer end of plunger 90 slides freely in sealed telescopic relation with piston 94, forming the axial chamber 97 of diameter $d$. Fluid in chamber 97 is maintained at return pressure by the axial through bore 91 in plunger 90. Hence the fluid pressure in the inner portion 96a of piston chamber 96 acts only on the annular area of the piston that is radially outward of the plunger diameter $d$. Pressure in the outer portion 96b of the piston chamber acts on essentially the entire piston area of diameter D.

In accordance with the present invention, the pressure in inner chamber 96a is typically maintained equal to the output pressure from pressure regulating valve 80, as by the open passage 98 between output chamber 94 and chamber 96a. The pressure in outer chamber 96b is caused to vary in accordance with an electrical command signal by means of suitable pilot valve structure, typically comprising the pressure and return pilot valves shown somewhat schematically at 100 and 110, respectively, communicating via the passage 104 with chamber 96b. Those valves are operated by the respective solenoids 102 and 112, which correspond in broad function to the solenoids 25 and 27 of FIG. 1. Outer chamber 96b will be referred to as the control chamber, inner chamber 96a as the feedback chamber.

Pilot valves 100 and 110 are both shown in FIG. 2 in deenergized condition of the solenoids, with the solenoid armatures withdrawn. Pressure valve 100 is then open and return valve 110 is closed. Energization of the respective solenoids projects valve 100 against its seat, closing the valve, and projects valve 110 away from its seat, opening the valve. Valve 100 controls flow from pressure chamber 76 to the passage 104 and thence to control chamber 96b, tending to increase the control pressure. Valve 110 controls flow from the control chamber via the passages 104 and 114 to return chamber 78, tending to lower the control pressure. The valves thus controllably vary the control pressure in much the same manner that valves 26 and 28 of FIG. 1 control the output pressure, but are required to handle only extremely small amounts of fluid.

Under equilibrium conditions the control pressure in chamber 96b substantially equals the feedback pressure in chamber 96a. The force exerted by piston 94 on spring 92 is then due only to the excess of the control pressure over the reference pressure in chamber 97, both acting on the central piston zone of diameter $d$. With the reference pressure effectively zero, and with $d$ corresponding to the effective diameter of poppet valve 82, the output pressure equals the control pressure.

If that equilibrium is disturbed, for example by alteration of the control pressure in chamber 96b due to pilot valve action, the control pressure change $\Delta p$ acts on the entire area of piston 94, not merely on the central zone of diameter $d$. The resulting differential force on the piston is correspondingly high. Hence the piston responds promptly even to a small change in control pressure. In particular, the amplifying effect of the large piston diameter typically reduces to negligible proportions any delay or hysteresis that might otherwise result from friction of the piston or its sealing O-rings in the cylinder.

On the other hand, as the required piston movement takes place, altering the compression of spring 92 and hence the output pressure at conduit 75, the pressure in feedback chamber 96a changes correspondingly. A new equilibrium is attained when the control and output pressures are again equal, with the new spring force again due to the control pressure in chamber 96b acting on the central piston zone of diameter $d$. The force amplifying action of the large outer zone of piston 94 insures prompt adjustment to small pressure increments, but does not impose high forces upon the system under equilibrium conditions.

The present piston 94 and its relation to pressure regulating valve 80 are superficially similar to the disclosure in my U.S. Pat. No. 3,006,696, issued Oct. 31, 1961. However, the patented structure utilizes a flow restricting orifice between the two sides of the modulating piston to limit the rate of adjustment to large pressure changes; whereas the present system typically has no such orifice and has the primary function of insuring prompt adjustment to small pressure changes.

In the illustrative electrical control system of FIG. 2, the command signal S1 is developed on the line 12 by the potentiometer R1, connected between ground and a source of positive voltage +E1 and controlled by the manual handle 13. Before comparison with the feedback signal S2, the initial command signal may be modified to incorporate any desired further function. For example, an anti-skid signal S5 may be developed by any suitable means, shown schematically at 60 and typically comprising the potentiometer R2, connected between ground and a source of positive voltage +E2. The potentiometer arm is driven from the skid control mechanism 62 which is coupled to the braked wheel 64 and acts in such a way that the output signal on the line 63 is zero during normal operation of wheel 64, but becomes increasingly positive in presence of abnormally rapid wheel deceleration. That skid signal is amplified and inverted by the amplifier M1 with the feedback resistance R4. Power and bias connections for amplifier M1, as for other amplifiers, are omitted from the drawing for clarity of illustration. The resulting negative skid signal S5 is summed with the positive initial command signal S1 by the summing resistances R3 and R5. The resulting signal S6 at junction A, representing the desired brake pressure as modified by an existing skid condition of wheel 64, will be referred to as the final command signal.

Final command signal S6 is compared with a monitor signal S2, representing the actual output pressure and developed by the transducer mechanism indicated schematically at 50. The rod 52 is fixedly mounted on the piston 94, which is part of the pressure regulating-valve structure already described. Rod 52 extends through the valve housing in sealed relation at 54 and drives the potentiometer R10, connected between ground and a source of positive voltage +E3. The resulting positive signal on the line 58 may readily be made proportional to the output pressure from valve 80, since that pressure is determined by the compression of spring 92 in response to movement of piston 94. That signal is amplified and inverted by the amplifier M2, producing on the line 59 the negative monitor signal S2 of suitable amplitude.

Negative monitor signal S2 is summed with positive command signal S6 by the summing resistors R6 and R14. Since S6 is positive and S2 negative, their addition is equivalent to subtraction of the quantities they represent. The resulting difference signal at B is amplified and inverted by the amplifier M3, producing onthe line 67 a signal that corresponds generally to difference signal S3 of FIG. 1, and will be so designated.

The present invention preferably insures prompt response of difference signal S3 to small changes in monitor signal S2 by effective differential amplification of that signal. In the present illustrative circuit summing resistor R14 is bypassed by the capacitor C1, providing a path of reduced impedance for transmission of voltage changes to summing junction B. Also, the initial monitor signal on line 58 is differentiated by the capacitor C2, amplified by the non-inverting amplifier M4 and coupled to line 67 as by the capacitor C3, where the resulting differential component signal is summed with difference signal S3. The desired magnitude of the resulting effective anticipation of changes in the initial monitor signal is readily determined by selection of circuit components and especially by selection or adjustment of the gain of amplifier M4. The circuit through M4 may be employed in place of the simple bypassing capacitor C1, or to supplement its action. Neither circuit affects the equilibrium condition of the system.

The circuit constants are so selected that when the command signal and monitor signal represent equal pressures signal S3 is zero. When the output pressure is too small and should be raised S3 is negative, and when the output pressure needs to be reduced S3 is positive. Those illustrative relations are listed for convenient reference in the accompanying table.

TABLE

| Desired Pressure Change | S3 | Solenoid | |
|---|---|---|---|
| | | Pressure | Return |
| Raise | − | Off | Off |
| Hold | 0 | On | Off |
| Reduce | + | On | On |

Control circuitry 68 controls the two valve solenoids 102 and 112 in response to difference signal S3 in accordance with the relations just described. That control action is further conditioned by the previously described preferred realtion that the output pressure is increased when both solenoids are deenergized, is reduced when both solenoids are energized, and is held constant when the pressure solenoid is energized and the return solenoid is deenergized. Those relations are also listed for reference in the Table.

Pressure solenoid 102 is connected in series with the PNP power transistor Tr3 between a source of positive voltage +E4 and ground. Return solenoid 112 is similarly connected in series with power transistor Tr4 between +E4 and ground. The solenoids are shunted by the diodes D2, D4 and D3, D5 to absorb voltage pulses resulting from swithcing action. The NPN switching transistors Tr1 and Tr2 are connected between ground and the respective bases of power transistors Tr3 and Tr4, with the current limiting series resistances R24 and R25. The emitters of both switching transistors are biased slightly above ground potential by the voltage dividing action of resistance R23 and the forwardly biased diode D1, connected between ground and the positive voltage source +E5. The input control signal S3 is supplied from line 67 to the bases of Tr1 and Tr2 via the respective resistances R20 and R21. Tr2 is thereby directly controlled by S3, being cut off when S3 is zero or negative, and being turned on when S3 has a positive value exceeding a definite threshold. On the other hand, the operation of Tr1 is biased toward conductive condition by connection of its base via the resistance R22 to positive voltage source E5. R22 and R20 are so proportioned that Tr1 conducts when control signal S3 is zero or positive, and is cut off only when S3 has a negative value exceeding a definite threshold. The negative and positive signal thresholds that thus control Tr1 and Tr2 correspond to relatively small values of the original difference signal at junction B, the ratio being controllable within wide limits by selection of the gain of amplifier M3.

To summarize the action of control circuit 68, when control signal S3 is more positive than a definite and effectively very small threshold, both Tr1 and Tr2 are maintained conductive. The bases of Tr3 and Tr4 are thereby effectively grounded, causing those transistors to conduct strongly and energizing both solenoids 102 and 112. Pressure valve 100 is thereby closed and return valve 110 opened, reducing the control pressure. When control signal S3 is more negative than a definite threshold, both switching transistors are cut off, effectively opening the bases of the power transistors and deenergizing both solenoids. Pressure valve 100 is then opened and return valve 110 is closed, raising the control pressure. When S3 lies between the two threshold values, and is thus effectively zero, Tr2 is cut off while Tr1 is held conductive via R22. Hence solenoid 102 is energized and solenoid 112 is deenergized, closing both valves and holding the control pressure at its existing value.

Assuming the described system to be initially in equilibrium, with feedback signal S2 equal to final command signal S6 and with both pilot valves 100 and 110 closed, any change in the command signal will actuate one or other of the pilot valves to produce a corresponding change in the pressure in control chamber 96b. The resulting unbalance force shifts the piston in a direction to modify the spring force and reestablish equilibrium in the manner already described. Transducer 50 modifies feedback signal S2 correspondingly in accordance with the movement of piston 94, terminating the valve action when the output pressure again corresponds to the altered command signal S6.

In a typical operation of the described system, the solenoid currents that control the two pilot valves normally adjust themselves to values which just hold the valves closed under equilibrium conditions of the overall system. Then only a slight change in solenoid current is required to alter the control pressure in chamber 96b and initiate adjustment to the change. The "deadband" or region of equilibrium is typically well under one percent of the available pressure range. Moreover, the resulting pressure change in control chamber 96b is reflected very promptly in a corresponding adjustment of output pressure, due in large part to the described differential amplifying action of piston 94. Monitor signal S2 also responds very promptly in zeroing difference signal S3. The pressure adjustment thus takes place essentially as a pulse or step action, requiring only a small fraction of a second. A single such step may reestablish equilibrium. More often, the initial disturbance continues at a definite rate, leading to a series of adjustment steps. Such steps may be mutually spaced in time if the continuing disturbance is a gradual one, such that each step reestablishes momentary equilibrium. If the continuing disturbance is rapid, such as a sudden relatively large change of command signal, or a rapid and large skid control signal, for example, the system typically responds by a series of adjustment steps which follow each other with amplitude and frequency characteristic of the combined electric and hydraulic system. A continuously variable analogue control signal thus leads to a stepwise or digital change of output pressure. The series of steps may lag somewhat behind a rapid change of control signal, but equilibrium is typically reestablished without overshoot and with an accuracy and freedom from hysteresis characteristic of conventional digital control systems.

What is claimed is:

1. A pressure control system for supplying a brake actuating fluid pressure to a vehicle wheel brake in response to an electrical command signal, said system comprising pressure regulating valve means, including a valve actuating member and an output chamber, for maintaining in the output chamber an output pressure proportional to a control force applied to the valve actuating member, pressure responsive means for applying said control force to the valve actuating member and including a movable member having oppositely directed first and second working faces exposed to said output pressure and to a control pressure, respectively, and means for resiliently coupling the movable member and the valve actuating member to apply to the movable member a yielding force for balancing said opposing pressures and to apply to the valve actuating member a correspondingly varying control force, transducer means coupled to said movable member for producing an electrical monitor signal corresponding to the member position, circuit means for comparing the command signal and the monitor signal and for developing a difference signal corresponding to their difference and having a normal equilibrium value, first and second pilot valve means controlled by said difference signal for increasing and decreasing, respectively, said control pressure in response to departure of said difference signal in respective directions from said normal value, and means for supplying to the brake a brake actuating pressure derived from said output pressure.

2. A pressure control system for supplying a brake actuating fluid pressure to a vehicle wheel brake in response to an electrical command signal, said system comprising pressure regulating valve means, including a valve actuating member and an output chamber, for maintaining in the output chamber an output pressure proportional to a control force applied to the valve actuating member, pressure responsive means for applying said control force to the valve actuating member and including a movable member resiliently coupled to the valve actuating member and having oppositely directed first and second working faces exposed to said output pressure and to a control pressure, respectively, transducer means coupled to said movable member for producing an electrical monitor signal corresponding to the member position, circuit means for comparing the command signal and the monitor signal and for developing a difference signal corresponding to their difference and having a normal equilibrium value, first and second pilot valve means controlled by said difference signal for increasing and decreasing, respectively, said control pressure in response to departure of said difference signal in respective directions from said normal value, and means for supplying to the brake a brake actuating pressure derived from said output pressure, said pressure regulating valve means comprising an axially movable valve poppet having an axial bore communicating at one end with said output chamber, and having inlet and outlet valves of substantially equal effective valve area at its opposite ends, and said second working face of said movable member having an effective area approximately equal to the sum of said effective valve area and the effective area of said first working face of said movable member.

3. A pressure control system according to claim 2, in which said circuit means include means responsive to the monitor signal for producing a signal representing the time derivative thereof, and means for effectively comparing the command signal and the sum of the monitor signal and the derivative signal.

4. A pressure control system for supplying a brake actuating fluid pressure to a vehicle wheel brake in response to an electrical command signal, said system comprising pressure regulating valve means, including a valve actuating member and an output chamber, for maintaining in the output chamber an output pressure proportional to a control force applied to the valve actuating member, pressure responsive means for applying said control force to the valve actuating member and including a movable member resiliently coupled to the valve actuating member and having oppositely directed first and second working faces exposed to said output pressure and to a control pressure, respectively, transducer means coupled to said movable member for producing an electrical monitor signal corresponding to the member position, circuit means for comparing the command signal and the monitor signal and for developing a difference signal corresponding to their difference and having a normal equilibrium value, said circuit means including means responsive to the monitor signal for producing a signal representing the time derivative thereof, and means for effectively comparing the command signal and the sum of the monitor signal and the derivative signal, first and second pilot valve means controlled by said difference signal for increasing and decreasing, respectively, said control pressure in response to departure of said difference signal in respective directions from said normal value, and means for supplying to the brake a brake actuating pressure derived from said output pressure.

* * * * *